Patented July 1, 1941

2,247,496

UNITED STATES PATENT OFFICE 2,247,496

PROCESS OF REFINING AND FRACTIONATION OF TALL OIL

Arthur W. Hixson, Leonia, N. J., and Ralph Miller, New York, N. Y., assignors to The Chemical Foundation, Incorporated, a corporation of Delaware No Drawing. Application March 29, 1939, Serial No. 264,780

4 Claims. (Cl. 260—97.5)

This invention is concerned generally with a process for the refining and fractionation of tall oil, and more particularly with the separation of its contained rosin acids, fatty acids and complex bodies in the evolution of light-colored rosin products.

Tall oil is a complex liquid containing primarily a mixture of fatty acids and rosin acids. Tall oil is secured by the acid decomposition of the crude soap formed when pine wood chips are digested with caustic solutions containing other chemicals, e. g., in the manufacture of kraft paper. Tall oil has a large number of potential uses but industry has been reluctant to employ it because no efficient method of fractionating it is known. The only refining process that has been employed industrially is distillation. Because of the small difference in vapor pressure of the constituents of tall oil, fractional distillation does not permit an efficient method of separating the rosin acids from the fatty acids.

It is an object of this invention to separate the rosin acids from the fatty acids in tall oil.

It is a further object of this invention to separate from the rosin and fatty acids the complex bodies such as tar and pitch which are present.

It is a further object of this invention to produce a multiplicity of rosin fractions.

It is an additional object of this invention to concentrate the color bodies so that light-colored products will be obtained.

Crude tall oil contains many complex bodies in addition to organic acids. Among the complex bodies that are particularly objectionable is a small amount of tar and pitch. In the process described below for fractionating tall oil, this tar is readily separated as one of the first steps. This is an important advantage of this unique process.

We have discovered that the rosin acids in tall oil can be efficiently separated from the fatty acids by the use of liquefied, normally gaseous, hydrocarbons. Normally gaseous hydrocarbons are hydrocarbons whose molecular weights are not greater than 72. Our preferred material is propane. It has been found that when tall oil is dissolved in liquefied, normally gaseous, hydrocarbons, the tar and pitch present does not dissolve, but settles readily in the fluid solution. Usually from 6 to 12 volumes of hydrocarbon are employed per volume of tall oil. The ready settling of the insoluble material takes place because liquefied, normally gaseous, hydrocarbons are very fluid and possess low densities. These advantageous properties are not enjoyed by any other solvents to such a marked degree. The settled insoluble materials may be separated from the hydrocarbon solution by decantation, filtration, or centrifugal force.

According to our process, this clear hydrocarbon solution is now heated under pressure. As the temperature is raised, it is found that the rosin acids separate from the hydrocarbon solution while the fatty acids remain in solution. When seven volumes of propane are employed for each volume of tall oil, more than one phase is present by the time the temperature has reached 150° F. The temperature at which a rosin phase begins to separate from the hydrocarbon phase depends upon the ratio of the volume of hydrocarbon to the volume of tall oil dissolved in it. The average molecular weight of the hydrocarbon employed also determines the temperature at which a rosin phase begins to form. The lower the average molecular weight of the hydrocarbon employed, the lower the temperature at which a rosin phase appears.

When propane is the hydrocarbon employed, and the ratio of propane to tall oil by volume is seven, it has been pointed out that a rosin phase has separated by the time the temperature has reached 150° F. If the rosin phase that has formed is separated from the hydrocarbon phase, and the hydrocarbon solution heated to a warmer temperature, an additional fraction of rosin will separate from the hydrocarbon solution. The second rosin phase may be separated from the hydrocarbon solution and the process repeated. In this manner the rosin acids may be separated into several different fractions. At a temperature of 205° F., substantially all the rosin acids will have separated from the hydrocarbon solution.

The fatty acids remain dissolved in the hydrocarbon. Thus, the rosin acids have been effectually separated from the fatty acids. In order to recover the fatty acids, the hydrocarbon solvent is distilled off. Because of the large difference in vapor pressure between the fatty acids and the hydrocarbons, this separation is simple and complete.

The above-described process provides an easy, simple method of refining and fractionating tall oil. It does not involve any chemical reactions; no reagents are consumed; and none of the constituents of tall oil are destroyed. This separation process enhances the value of tall oil because it permits it to be fractioned into two different classes of compounds instead of being a mixture. The preliminary separation of the tar and pitch removes a considerable portion of the constituents of tall oil that cause it to be dark in color. Most of the colored bodies initially soluble in the hydrocarbon solution are concentrated in the first rosin phase. This permits the subsequent rosin fractions that are obtained to be lighter in color than the first rosin fraction. At the same time the colored bodies are separated from the fatty acids.

Having described our invention and indicated its advantages, we claim:

1. The process of refining and fractionating tall oil comprising the steps of dissolving tall oil in a mixture of liquefied, normally gaseous hydrocarbons; separating any insoluble material from the hydrocarbon solution; warming the clear hydrocarbon solution under pressure until substantially all the rosin acids have separated from the hydrocarbon solution; separating the rosin phase from the hydrocarbon phase; and distilling the hydrocarbon solution to recover the fatty acids.

2. The process of refining and fractionating tall oil comprising the steps of dissolving tall oil in liquid propane; separating any insolble material from the hydrocarbon solution; warming the liquid propane under pressure until substantially all the rosin acids have separated from the propane solution; separating the rosin phase from the propane phase; and distilling off the propane to recover the fatty acids.

3. The process of securing a plurality of rosin fractions from tall oil comprising the steps of dissolving tall oil in liquefied, normally gaseous, hydrocarbons; warming the solution under pressure until a rosin phase forms; separating the rosin phase from the hydrocarbon phase; increasing the temperature of the hydrocarbon solution until a second rosin phase forms; separating the second rosin phase from the hydrocarbon phase; and repeating the process until substantially all the rosin has been separated from the hydrocarbon solution.

4. In the process of separating complex bodies such as tar, pitch and color bodies from tall oil, the steps of adding tall oil to a liequefied, normally gaseous, hydrocarbon and warming the resultant mixture until a small quantity of rosin is caused to precipitate and form a rosin phase in which the color bodies are concentrated; separating such lower phase from the upper phase and removing the solvent from each phase.

ARTHUR W. HIXSON.
RALPH MILLER.